(12) United States Patent
Cagnac et al.

(10) Patent No.: US 8,063,627 B2
(45) Date of Patent: Nov. 22, 2011

(54) LINEAR SENSOR HAVING ANGULAR REDIRECTION AND CABLE DISPLACEMENT

(75) Inventors: Bastien Cagnac, Cramoisy (FR); Jean Fourcade, Laille (FR)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 12/337,802

(22) Filed: Dec. 18, 2008

(65) Prior Publication Data
US 2009/0160435 A1    Jun. 25, 2009

(30) Foreign Application Priority Data
Dec. 21, 2007    (FR) .......................... 07 09131

(51) Int. Cl.
*G01B 7/14* (2006.01)
*G01B 7/30* (2006.01)
*G01R 33/06* (2006.01)
*H01L 43/06* (2006.01)

(52) U.S. Cl. .................................. 324/207.2
(58) Field of Classification Search .............. None
See application file for complete search history.

(56) References Cited

U.S. PATENT DOCUMENTS
6,507,270 B2  1/2003  Okumura et al.
6,745,666 B2  6/2004  Zilioli FOREIGN PATENT DOCUMENTS
DE  4306539 A1   9/1994
DE  10133163 A1  8/2002
FR  2897933 A1   8/2007
JP  2000161986 A  6/2000

OTHER PUBLICATIONS
FR 0709131 Search Report and Written Opinion, 7 pages.

*Primary Examiner* — Roberto Velez
(74) *Attorney, Agent, or Firm* — Michael Best & Friedrich LLP

(57) ABSTRACT

The linear sensor 1 for measuring an axial path $L_0$ of a part 2 sliding in an axial direction 20 in a frame 3 comprises a mobile part 4 cooperating with a fixed part 5, said mobile part 4 comprising:
a longitudinal element 40 cooperating at one end 400 with said part 2, any translation of said part 2 in said axial path causing a corresponding displacement of its other end 401; and a magnetic field source 41 integral with the end 401, said fixed part 5 comprising a receiving means 50 for said magnetic field. The linear sensor is characterized in that said fixed part 5 comprises an angular redirection means 53 cooperating with said longitudinal element 40 and thus transforming said axial path of the end 400 into a radial path of the other end 401.

19 Claims, 4 Drawing Sheets

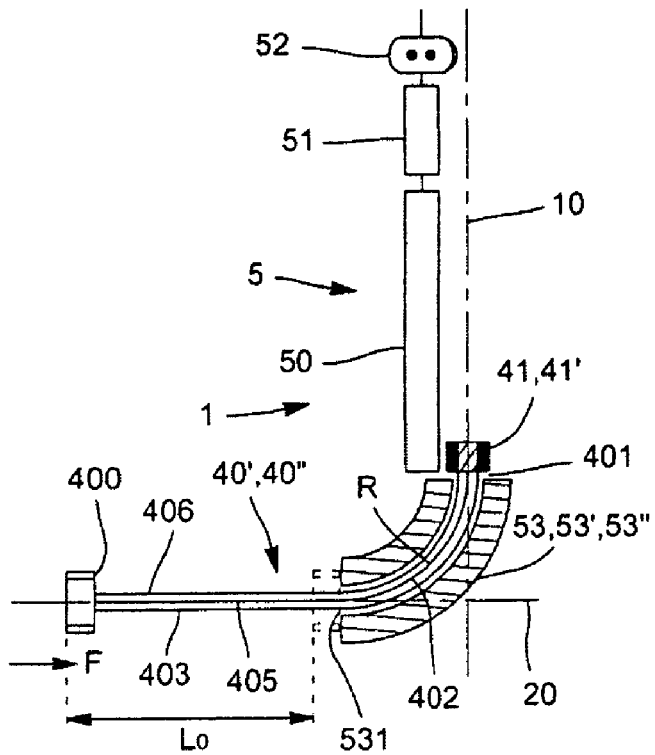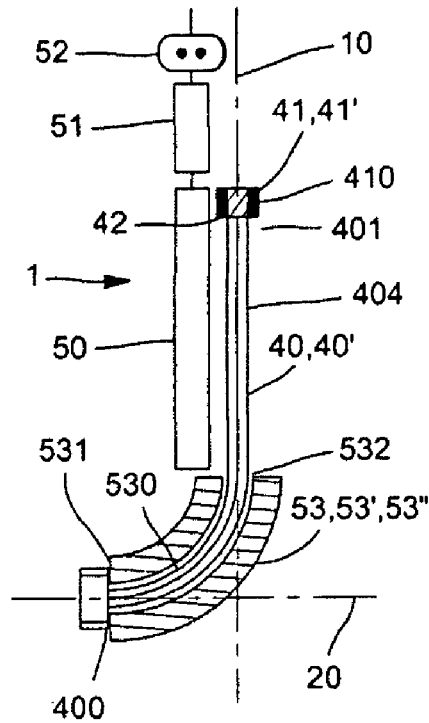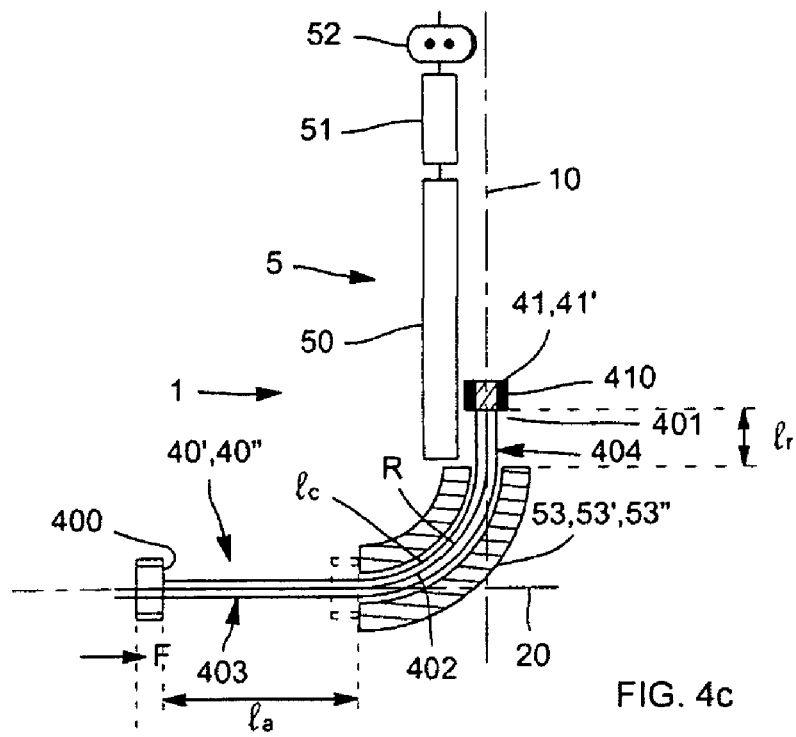

LINEAR SENSOR HAVING ANGULAR REDIRECTION AND CABLE DISPLACEMENT

BACKGROUND AND SUMMARY OF THE INVENTION

The invention relates to the field of displacement sensors and, more specifically, displacement sensors used in motor vehicle devices or equipment, for example in braking devices or power-assisted braking devices.

Displacement sensors are already well known in principle. Said linear sensors, for measuring an axial path of a part sliding in an axial direction in a frame, comprise a so-called mobile part cooperating with a so-called fixed part. Said mobile part of the sensor comprises:

- a longitudinal element cooperating with said part so that any translation of said part causes an axial translation of said mobile part; and
- a magnetic field source integral with said longitudinal element at its end so that any displacement of said upper end causes the displacement of said source.

Said fixed part comprises a receiving means for said magnetic field source arranged opposite said source and capable of sending a signal known as the primary signal, depending on the axial path of said part, to a transducer capable of converting said primary signal into an electrical signal transmitted to a connector making it possible to transfer said electrical signal to an external electrical circuit.

The displacement sensors of the prior art have several types of problems:

- firstly, the sensors may have a problem of restricted space, to the extent that they have to be positioned in a relatively small space, in particular in said axial direction corresponding to the direction of displacement of the mobile part sliding in the fixed frame;
- moreover, the sensors may have problems of reliability and/or of calibration; and
- finally, the sensors may present difficulties in terms of mounting, in particular taking into account the restricted access for said mobile part.

More specifically, these problems are posed even more acutely when said sensors have to be installed on braking devices or power-assisted braking devices.

A first subject of the invention consists of a linear sensor permitting the problems posed to be solved.

A second subject of the invention consists in using such a sensor in motor vehicle devices or equipment, for example in braking devices or power-assisted braking devices.

According to the invention, the linear sensor is provided for measuring an axial path $L_0$ of a part sliding in an axial direction in a frame with a transverse wall perpendicular to said axial direction, comprising a part known as a mobile part cooperating with a part known as a fixed part, said mobile part comprising:

- a longitudinal element cooperating, at its so-called lower end, with said part using a first connecting means, so that said lower end is mobile in an axial path following that of said mobile part, any translation of said part causing an axial translation of said lower end, and a displacement of said longitudinal element causing a corresponding displacement of its so-called upper end; and
- a magnetic field source integral with said longitudinal element at its upper end, using a so-called second connecting means, so that any displacement of said upper end causes the displacement of said source, said fixed part comprising a receiving means for said magnetic field opposite said source and capable of sending a signal known as the primary signal, depending on said axial path, to a transducer capable of converting said primary signal into an electrical signal S transmitted to a connector, making it possible to transfer said electrical signal S to an external electrical circuit.

The linear sensor is characterized in that said fixed part comprises an angular redirection means cooperating with said longitudinal element using an angled part and thus transforming said axial path of said lower end into a radial path of said upper end, in a direction known as the radial direction which is typically perpendicular to said axial direction so that said sensor has a low axial spatial requirement, typically less than $3L_0$.

The linear sensors according to the invention solve the problems posed. More specifically:

- on the one hand, they have a very low axial spatial requirement, to the point of possibly not requiring their own axial spacing;
- on the other hand, they may be tested and calibrated before being installed at the junction between said frame and said mobile part sliding in said fixed frame; and
- finally, their spatial requirement, which is essentially radial, facilitates their assembly at the junction between said frame and said mobile part.

BRIEF DESCRIPTION OF THE DRAWINGS

FIG. 4 comprises two sectional views 4a and 4b.

FIG. 1 shows the linear sensor 1 comprising a fixed part 5 and a mobile part 4 integral with a piston 2' forming said mobile part 2.

In FIG. 2, similar to FIG. 1, said fixed part 5 has been shown after having removed the cover 7b of the rigid housing 7 housing, in particular, the magnetic field source 41 and said receiving means 50 for the magnetic field.

FIG. 3 shows the linear sensor 1, its fixed part 5 being integral with a pneumatic servo unit 3' forming said frame 3, its mobile part 4 being integral with a piston 2' forming said mobile part 2.

FIGS. 4a and 4b show schematically the principal functional elements of said linear sensor 1 according to the two extreme positions of said lower end 400 and upper end 401 of said flexible longitudinal element 40', FIG. 4c showing an intermediate position. In FIG. 4a, said lower end 400 is moved away to a maximum extent in said radial direction 10, whilst in FIG. 4b, said lower end 400 is brought closer to a maximum extent in said radial direction 10.

DETAILED DESCRIPTION

In one advantageous embodiment, said longitudinal element 40 is a flexible longitudinal element 40', for example a cable, said flexible longitudinal element 40' extending continuously from said lower end 400 to said upper end 401 over a curvilinear length $l > L_0$.

Thus, any axial displacement of said lower end 400 of said flexible longitudinal element 40' causes corresponding radial displacement of its so-called upper end 401.

Figure 1:
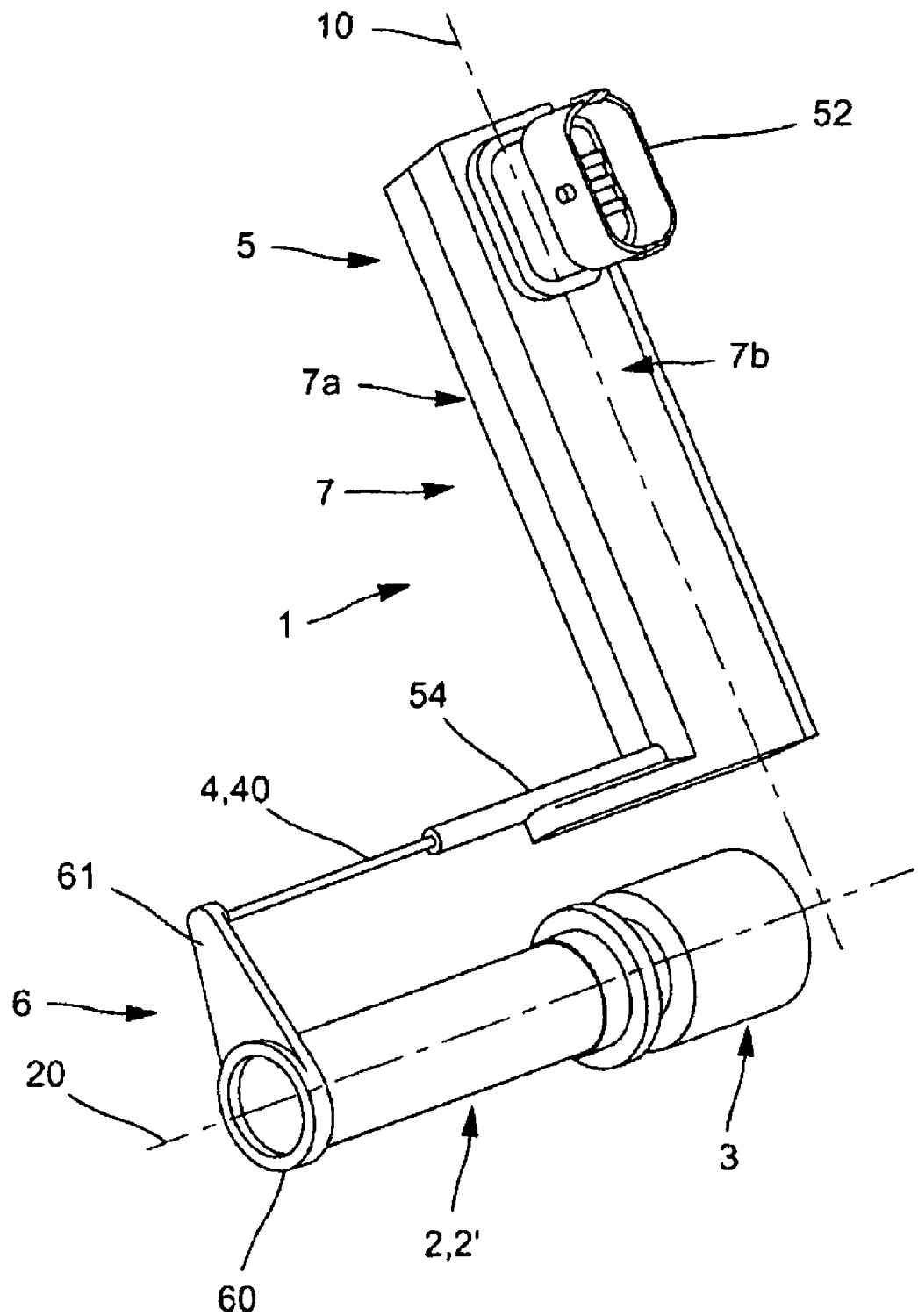
FIGS. 1 to 3 are views in perspective according to the invention.
Figure 2:
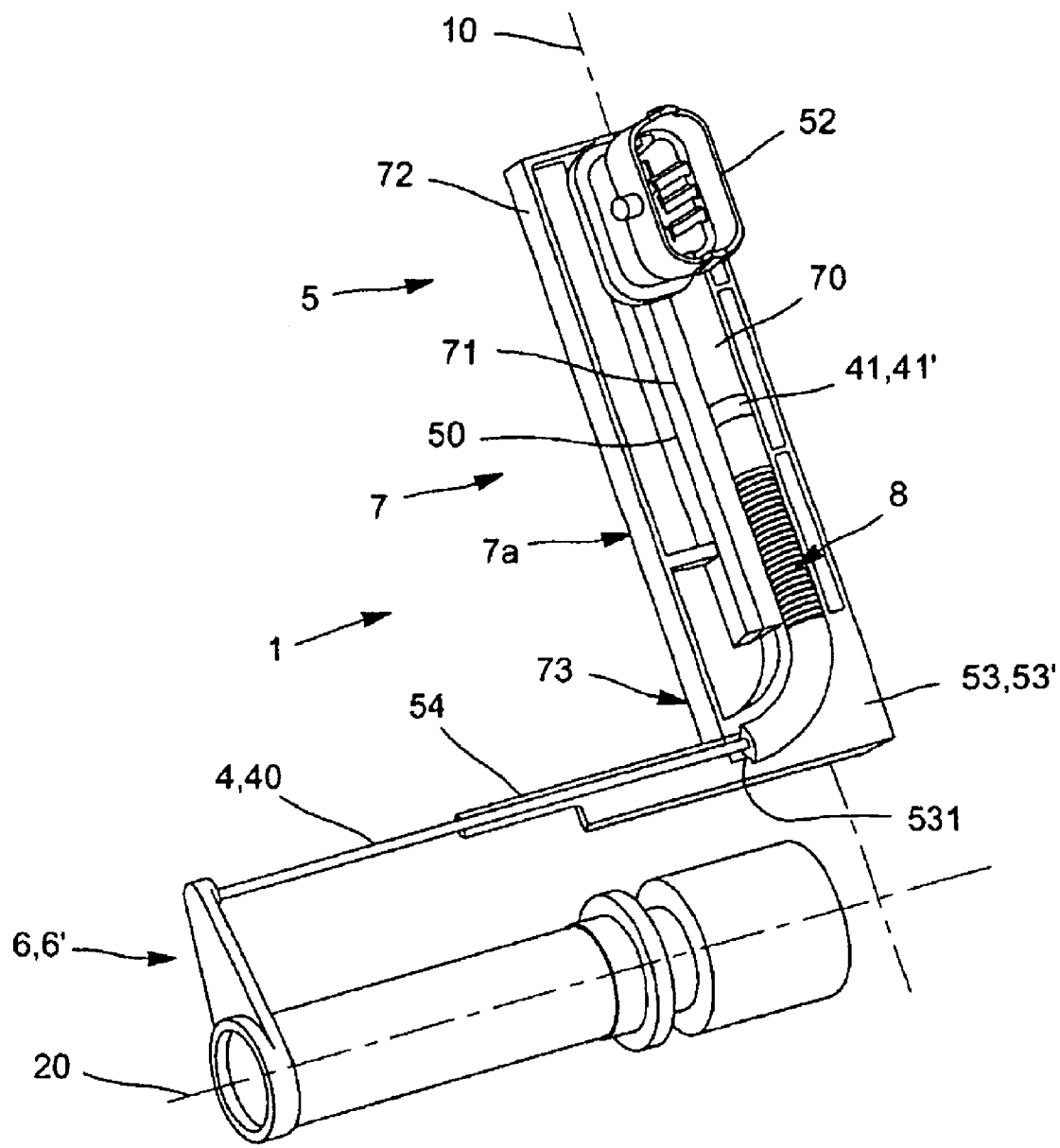
Figure 3:
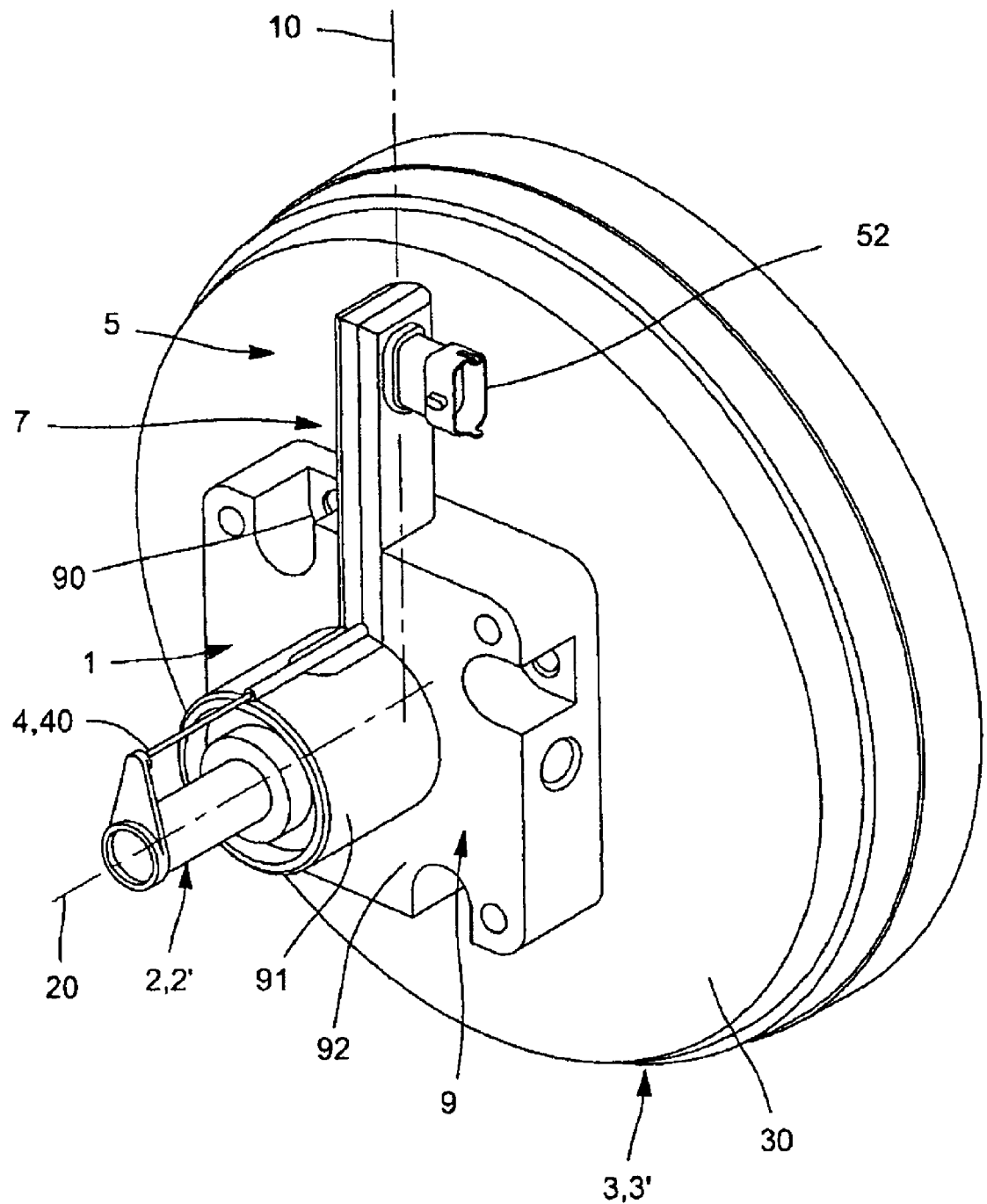

As illustrated in FIGS. 1 to 3, said angular redirection means 53 is an angular redirection of 90° 53' comprising a cavity, for example a tubular cavity 530 with an average radius of curvature R, forming a guide element angled at 90° for said angled part 402 of said flexible longitudinal element 40', said tubular cavity 530 having a lower orifice known as the axial orifice 531 and an upper orifice known as the radial orifice 532.

As illustrated in FIGS. 4a, 4b and 4c, said flexible longitudinal element 40' has a curvilinear length l at least equal to the sum $L_0+l_C$, the length $l_C$ equal to $0.5\pi R$ corresponding to the length of said angled part 402 of said longitudinal element 40' still present in said angular redirection 53', said curvilinear length l being equal to the sum $l_A+l_C+l_R$, with $l_A$ and $l_R$ denoting respectively the lengths of the axial part 403 and radial part 404 of said flexible longitudinal element 40' as illustrated in FIG. 4c.

According to the invention, said flexible longitudinal element 40' has a resistance to flexion greater than a force F required to effect said displacement of said longitudinal element 40', said force F being the compressive force exerted on said lower end 400 of said flexible longitudinal element 40' regarding its displacement in a so-called "forward" direction as illustrated in FIG. 4a, so that there is no buckling of the axial part 403 or of the radial part 404 which could reduce the reliability or the accuracy of the measurement of said axial path.

Advantageously, and as illustrated in FIGS. 4a and 4b, said flexible longitudinal element 40' is a composite longitudinal element 40", comprising a central core 405 preferably forming a metal cable, and a sheath or external surface coating 406 capable of reducing the friction between said flexible longitudinal element 40' and in particular said angular redirection means 53, 53', said sheath 406 preferably being a sheath made of TEFLON®.

As illustrated in FIGS. 1 to 3, said fixed part 5 advantageously comprises, moreover, a longitudinal housing 7, preferably a rigid housing, intended to be fixed to said frame 3, and preferably to said transverse wall 30 of said frame 3, said housing 7 comprising at least two parallel longitudinal parts forming, for example, parallel longitudinal cavities, a so-called first part or cavity 70 of said housing 7 accommodating said radial part 404 of said flexible longitudinal element 40' and said source 41, and forming a radial guide means for said source 41, a so-called second part or cavity 71 of said housing (7) accommodating said receiving means 50 and said transducer 51, said housing 7 comprising at its so-called upper end 72 said connector, and at its so-called lower end 73 said angular redirection means 53, 53'.

Preferably, said housing 7 is formed by the cooperation of a base 7a and a cover 7b, said base 7a and said cover 7b being molded parts made of plastics material so as to form said cavities 70, 71, said angular redirection means 53, 53' and possibly, the part made of plastics material of said connector 52, said cover 7b and said base 7a cooperating by welding or by clipping, preferably in an irreversible manner, the opposing male and female elements.

As illustrated in FIG. 2, said axial orifice 531 of said angular redirection 53' opens into an axial tubular element 54 forming an axial guide means of a portion of said axial part 403 of said flexible longitudinal element 40', said axial tubular element 54 forming, preferably, an integral part with said housing 7.

According to the invention, said source 41 is a permanent magnet 41', said permanent magnet 41' preferably comprising, at least over part of its height, a lateral coating 410 capable of facilitating the sliding thereof in said first cavity 70, said lateral coating 410 being, for example, a TEFLON®coating.

As illustrated in FIG. 2, said sensor 1 comprises a return spring 8 housed in said first cavity 70 cooperating with said source 41 or with said radial part 404 of said flexible longitudinal element 40', said spring 8 exerting a force F' opposing said force F, so that when said first connecting means 6 forms a thrust element 6' integral with said part 2, said thrust element 6' comprising a ring 60 for fixing to said part 2 and a radial projection 61 pushing the lower end 400 of said flexible longitudinal element 40' in said "forward" movement of said part by exerting said compressive force F, said lower end 400 of said flexible longitudinal element 40' remains in contact with said radial projection 61 during the so-called "return" movement of said part 2.

As illustrated in FIGS. 4a and 4b, said angular redirection means 53 comprises a sleeve 53" forming a quarter torus of 90°, said sleeve 53", cooperating with a corresponding cavity of said housing 7, said sleeve 53" comprising said tubular cavity 530, said sleeve 53" possibly forming a stop for said return spring 8.

According to the invention, said primary signal relative to a given position of said source 41 which is mobile relative to said fixed receiving means 50, corresponds to a measurement of an electric variable of a circuit selected from: resistance, capacity, impedance.

Said electrical signal S is a linear signal $S_L$, said linear signal $S_L$ being possibly obtained by processing said electrical signal S using an electronic means or using calibration, so that the ratio $\Delta S_L/\Delta L$ is constant for any variation $\Delta S_L$ of the signal S resulting from a variation $\Delta L$ of said path of said part.

As illustrated in FIG. 3, said fixed part 5 of said sensor 1 is integral with said frame 3 by means of an intermediate support 9. Said support 9 comprises an axial part 91 and a radial part 92 assembled to said transverse wall 30 by a plurality of fixing means 90.

A further subject of the invention consists of the use of a sensor according to the invention in motor vehicle devices or equipment, for example in braking devices or power-assisted braking devices.

In a particularly advantageous use, said part 2 is a piston 2' and said frame 3 is a master cylinder and/or a pneumatic brake booster 3', so as to detect the axial displacement of said piston 2' in said master cylinder and/or in said servo unit 3'.

FIGS. 1 to 4b consist of embodiments of linear sensors 1 according to the invention.

FIG. 3 illustrates, moreover, the use of such sensors in a braking device.

The device according to the invention has numerous advantages. It may be installed with a reduced spatial requirement. It may be tested separately before being mounted on an assembly comprising said frame 3 and said mobile part 2.

The invention claimed is:

1. Linear sensor (1) for measuring an axial path ($L_o$) of a mobile part (2) sliding in an axial direction (20) in a frame (3) with a transverse wall (30) perpendicular to said axial direction (20), comprising a mobile part (4) cooperating with a fixed part (5), said mobile part (4) comprising:

a longitudinal element (40) cooperating at a lower end (400) with said mobile part (2) using a first connecting means (6), so that said lower end (400) is mobile in an axial path following that of said mobile part (2), any translation of said mobile part (2) causing an axial translation of said lower end (400), and a displacement of said longitudinal element (40) causing a corresponding displacement of an upper end (401);

a magnetic field source (41) integral with said longitudinal element (40) at said upper end (401), using a second connecting means (42), so that any displacement of said upper end (401) causes the displacement of said source (41), said fixed part (5) comprising a receiving means (50) for said magnetic field, opposite said source (41)

and capable of sending a primary signal, depending on said axial path, to a transducer (51) capable of converting said primary signal into an electrical signal S transmitted to a connector (52) making it possible to transfer said electrical signal (S) to an external electrical circuit; and characterized in that said fixed part (5) comprises an angular redirection means (53) cooperating with said longitudinal element (40) using an angled part (402) and thus transforming said axial path of said lower end (400) into a radial path of said upper end (401).

2. Sensor according to claim 1, in which said longitudinal element (40) is a flexible longitudinal element (40'), said flexible longitudinal element (40') extending continuously from said lower end (400) to said upper end (401) over a curvilinear length 1>[$L_o$] axial path ($L_o$).

3. Sensor according to claim 2 in which said angular redirection means (53) is an angular redirection of 90° (53') comprising a cavity (530) with an average radius of curvature (R) forming a guide element angled at 90° for said angled part (402) of said flexible longitudinal element (40').

4. Sensor according to claim 3, in which said flexible longitudinal element (40') has a curvilinear length (1) at least equal to a sum $L_o + l_c$, the length $l_c$ equal to $0.5\pi R$ corresponding to the length of said angled part (402) of said longitudinal element (40') in said angular redirection (53'), said curvilinear length (1) being equal to a sum $l_A + l_C + l_R$ with $l_A$ and $l_R$ denoting respectively the lengths of the axial part (403) and radial part (404) of said flexible longitudinal element (40').

5. Sensor according to claim 3, in which said axial orifice (531) of said angular redirection (53') opens out into an axial tubular element (54) forming an axial guide means of a portion of said axial part (403) of said flexible longitudinal element (40'), said axial tubular element (54) forming, an integral part with said housing (7).

6. Sensor according to claim 3, in which said angular redirection means (53) comprises a sleeve (53") forming a quarter torus of 90°, said sleeve (53") cooperating with a corresponding cavity of said housing (7), said sleeve (53") comprising said cavity (530).

7. Sensor according to claim 6, wherein said sleeve (53") forms a stop for said return spring (8).

8. Sensor according to claim 3, wherein said cavity (530) has a lower axial orifice (531) and an upper radial orifice (532).

9. Sensor according to claim 2 in which said flexible longitudinal element (40') has a resistance to flexion greater than a first force (F) required to effect said displacement of said flexible longitudinal element (40'), said first force (F) being the compressive force exerted on said lower end (400) of said flexible longitudinal element (40') regarding its displacement in a forward direction.

10. Sensor according to claim 2, in which said flexible longitudinal element (40') is a composite longitudinal element (40"') comprising a central core (405) forming a metal cable, and a sheath or external surface coating (406) capable of reducing the friction between said flexible longitudinal element (40') and, said angular redirection means (53, 53').

11. Sensor according to claim 1, in which said fixed part (5) comprises, a longitudinal rigid housing (7) configured to be fixed to said frame (3) and to said transverse wall (30) of said frame (3), said housing (7) comprising at least two parallel longitudinal parts forming a first part or cavity (70) of said housing (7) accommodating said radial part (404) of said flexible longitudinal element (40') and said source (41) and forming a radial guide means for said mobile source (41), a second part or cavity (71) of said housing (7) accommodating said receiving means (50) and said transducer (51), said connector (52) is positioned at an upper end (72) of said housing (7), and said angular redirection means (53, 53') is positioned at a lower end (73) of said housing (7).

12. Sensor according to claim 11 in which said housing (7) is formed by the cooperation of a base (7a) and a cover (7b), said base (7a) and said cover (7b) being molded of plastics material so as to form said cavities (70, 71), said angular redirection means (53, 53') and said connector (52), said cover (7b) and said base (7a) cooperating by welding or by clipping, in an irreversible manner, opposing male and female elements.

13. Sensor according to claim 1, in which said source (41) is a permanent magnet (41'), said permanent magnet (41') comprising at least over part of its height, a lateral coating (410) capable of facilitating the sliding thereof in said first cavity (70).

14. Sensor according to claim 1, comprising a return spring (8) housed in said first cavity (70) cooperating with said source (41) or with said radial part (404) of said flexible longitudinal element (40'), said spring (8) exerting a second force (F') opposing said first force (F), so that when said first connecting means (6) forms a thrust element (6') integral with said mobile part (2), said thrust element (6') comprising a ring (60) for fixing to said mobile part (2) and a radial projection (61) pushing the lower end (400) of said flexible longitudinal element (40') in said forward movement of said part by exerting said compressive first force (F), said lower end (400) of said flexible longitudinal element (40') remains in contact with said radial projection (61) during a return movement of said mobile part (2).

15. Sensor according to claim 1, in which said primary signal relative to a given position of said source (41), which is mobile relative to said fixed receiving means (50), corresponds to a measurement of an electrical variable of a circuit selected from at least one of resistance, capacity and impedance.

16. Sensor according to claim 1, in which said electrical signal (S) is a linear signal ($S_L$) and $l_A$ denotes the length of an axial part (403), wherein a ratio $\Delta S_L/\Delta l_A$, is constant for any variation $\Delta S_L$ of the signal (S) resulting from a variation $\Delta l_A$ of said path of said part.

17. Sensor according to claim 16, wherein said linear signal ($S_L$) is obtained by processing said electrical signal (S) using an electronic means or using calibration.

18. Sensor according to claim 1, in which said fixed part (5) is integral with said frame (3) by means of an intermediate support (9).

19. A method of detecting a radial displacement by a linear sensor (1), the method comprising:

measuring an axial displacement of a of a piston of a braking device of a motor vehicle relative to a frame of the motor vehicle, the piston sliding in an axial direction (20) in a frame (3) with a transverse wall (30) perpendicular to said axial direction (20) of a mobile part (4) cooperating with a fixed part (5), said mobile part (4) including a longitudinal element (40) cooperating at a lower end (400) with said piston using a first connecting means (6), so that said lower end (400) is mobile in an axial path following that of said piston, any translation of said mobile part (2) causing an axial translation of said lower end (400), and a displacement of said longitudinal element (40) causing a corresponding displacement of an upper end (401);

a magnetic field source (41) integral with said longitudinal element (40) at said upper end (401), using a second connecting means (42), so that any displacement of said upper end (401) causes the displacement of said source (41), said fixed part (5) comprising a receiving means (50) for a magnetic field produced by said magnetic field source (41), opposite said source (41) and capable of sending a primary signal, depending on said axial path, to a transducer (51) capable of converting said primary signal into an electrical signal (S) transmitted to a connector (52) making it possible to transfer said electrical signal (S) to an external electrical circuit; and transforming said axial displacement of said lower end (400) into a radial displacement of said upper end (401) by said fixed part (5) comprising an angular redirection means (53) cooperating with said longitudinal element (40) using an angled part (402).

* * * * *